United States Patent
Radinger et al.

(10) Patent No.: US 7,384,367 B2
(45) Date of Patent: Jun. 10, 2008

(54) PLANET CARRIER FOR A GEARBOX

(75) Inventors: Norbert Radinger, Nürnberg (DE); Matthias Fick, Schnaittach (DE)

(73) Assignee: Schaeffler KG, Herzogenaurach (DE)

( * ) Notice: Subject to any disclaimer, the term of this patent is extended or adjusted under 35 U.S.C. 154(b) by 117 days.

(21) Appl. No.: 10/565,864

(22) PCT Filed: Jul. 10, 2004

(86) PCT No.: PCT/EP2004/007637

§ 371 (c)(1), (2), (4) Date: Jan. 24, 2006

(87) PCT Pub. No.: WO2005/015056

PCT Pub. Date: Feb. 17, 2005

(65) Prior Publication Data

US 2006/0196307 A1    Sep. 7, 2006

(30) Foreign Application Priority Data

Jul. 25, 2003  (DE) ................. 103 33 879

(51) Int. Cl.
*F16H 57/08* (2006.01)
(52) U.S. Cl. ........................................ 475/331
(58) Field of Classification Search ........... 475/331, 475/314, 316, 323, 326–329, 282, 285, 286, 475/338, 340
See application file for complete search history.

(56) References Cited

U.S. PATENT DOCUMENTS

| | | | |
|---|---|---|---|
| 3,587,347 A * | 6/1971 | Hanzi et al. .................. | 475/281 |
| 3,667,324 A * | 6/1972 | Laing ........................... | 475/159 |
| 3,842,481 A | 10/1974 | Laing | |
| 4,129,050 A * | 12/1978 | Akashi et al. ............... | 475/327 |
| 5,292,292 A | 3/1994 | Heinrich et al. | |
| 5,470,286 A * | 11/1995 | Fan .............................. | 475/331 |
| 5,928,105 A * | 7/1999 | Taha et al. .................. | 475/331 |
| 6,434,827 B1 * | 8/2002 | Trent et al. .................. | 29/893.1 |
| 6,918,853 B2 * | 7/2005 | Tanikawa ..................... | 475/348 |

(Continued)

FOREIGN PATENT DOCUMENTS

DE    2 024 469    5/1974

(Continued)

*Primary Examiner*—Charles A. Marmor
*Assistant Examiner*—Justin K. Holmes
(74) *Attorney, Agent, or Firm*—Volpe and Koenig, PC

(57) ABSTRACT

A planet carrier (2) for a gearbox is provided, especially for an automatic transmission or a power-shift gearbox. The planet carrier (2) includes at least one planet gear (4) that is in constant contact with a sun gear and an internal geared wheel. The planet carrier (2) is formed from two parts and includes a single piece flange part (11) and a single piece cup body (12) formed in a step-type manner. The two components are rotationally symmetrical or approximately rotationally symmetrical, and are arranged with one at least partially inside the other. The internal diameter of the external part is adapted to the internal diameter of the internal part in an overlapping area. The two components are connected together at contact points. The components are positioned in a precise manner in relation to each other in the axial, radial and peripheral directions based on the construction. The individual components can be produced in a simple and economical manner through deep drawing.

14 Claims, 3 Drawing Sheets

U.S. PATENT DOCUMENTS

| | | | |
|---|---|---|---|
| 6,929,578 B1 * | 8/2005 | Rowell | 475/331 |
| 2005/0130794 A1 * | 6/2005 | Jinbo | 475/331 |
| 2005/0164823 A1 * | 7/2005 | Huber et al. | 475/331 |

FOREIGN PATENT DOCUMENTS

| | | |
|---|---|---|
| DE | 43 02 844 | 7/1994 |
| DE | 195 44 197 | 6/1997 |
| EP | 0 684 409 | 11/1995 |
| GB | 1 212 630 | 11/1970 |
| JP | 07-133848 | 5/1995 |
| WO | WO 99/37931 | 7/1999 |

* cited by examiner

PLANET CARRIER FOR A GEARBOX

BACKGROUND

The invention relates to a planet carrier for a gearbox, especially an automatic gearbox or a powershift gearbox, in which planet gears are mounted on pins and these planet gears engage a sun gear, which is arranged coaxial to the center axis of the planet gear, and an internal geared wheel. Furthermore, the planet carrier is provided with a plate body for clutch or brake plates.

Planetary gearboxes of the above-noted type are used primarily in automatic transmissions or powershift gearboxes. They comprise a central sun gear, an internal geared wheel arranged concentric to the sun gear, and several planet gears, which are arranged between the sun and the internal geared wheel. The rotational axes of the planet gears are aligned parallel but with axial spacing to the axes of the sun gear and the internal geared wheel, with the teeth of the planet gears being in constant engagement with the teeth of the sun gear or the internal geared wheel. The planet gears are mounted rotatably on a planet carrier. The planet carrier, sun gear, and internal geared wheel can be coupled to each other or to a stationary gearbox component for changing the gear transmission ratio, whereby the components coupled to each other are held to the same rpm or fixed so that they cannot rotate. The coupling of various components is generally implemented through brake or plate clutches.

Planet carriers for gearboxes are known, which comprise a one-piece or multiple-piece carrier flange for the planet gears and a rotationally symmetric cup-shaped part. Teeth for clutch plates or brake plates are typically formed on the cup-shaped part. Such a device is known from DE 195 44 197. Accordingly, the planet carrier is constructed from a support base and a support cover, which define two parallel, spaced support planes separated by spacer columns. The connection between the support base and the support cover is produced by means of a weld connection via radially outwardly pointing flange plates formed on the open ends of the spacer columns. In this way, the flange plates are connected to each other by means of ring segments. It is further explained that the support base is to be produced as a cast or forged part, which leads to the fact that expensive finishing work must be performed on the support base in the region of the spacer columns. Additional disadvantages of this solution are high production costs of cast or forged parts, their high weight, and low strength in the region of edges.

Another configuration of a planet carrier is shown in German Patent Publication DE 43 02 844. Here, the configuration involves a planet carrier comprising a planet carrier hub part and a side wall component, which are formed as extruded or sheet-pressed parts. The side wall component is a cup-shaped plate body, while the planet carrier hub part comprises a ring-shaped disk and a tubular projection. Both components are rotationally symmetric with the exception of impressions, which extend in the axial direction. The impressions extend from the base of the side wall component outwards in the axial direction and from the disk of the planet carrier hub part axially away from the ring-shaped projection. The shape of the axial impressions makes complicated processing steps necessary during the shaping process.

When the planet carrier is assembled, the two components are welded to each other in the region of the impressions. Here, it must be guaranteed that they are positioned exactly both in the axial and also in the radial and peripheral directions. This requires enormous accuracy in the formation of the impressions and complicated positioning and centering means in the production of the weld connection, which counteracts an economical production of the planet carrier.

SUMMARY

The invention is based on the objective of avoiding the noted disadvantages and thus creating a weight-optimized planet carrier, whose individual parts can be produced economically and with high dimensional accuracy and can be joined without expensive positioning means.

According to the invention, this objective is met in that the planet carrier for a gearbox has a flange part comprising a radially extending first ring-shaped disk, which is provided with an axially formed receptacle and an axially extending cup-shaped projection, which extends from an inner edge of the receptacle; and a step-like cup body comprising a first sleeve section and a second sleeve section of smaller and larger diameters, respectively. These sleeve sections are connected so that they are axially offset relative to one another, at one of each of their ends by a radially extending, second ring-shaped disk. The cup body further comprises an angled, ring-shaped projection on the outer end of the first sleeve section. The outer diameter of the first sleeve section is adapted to the inner diameter of the receptacle of the flange part, so that the cup body engages on its projection-side end in the radial receptacle of the flange part and is partially overlapped by this in the axial direction. Therefore, the ring-shaped projection contacts the receptacle of the flange part in the axial direction. A ring-shaped weld connection between the ring-shaped projection and the receptacle connects the step-like cup body to the flange part. Furthermore, recesses for planet gears are formed in the first sleeve section. Through these recesses, the planet gears are guided inwards through the sleeve section and engage in the sun gear.

The above described arrangement enables a planet carrier according to the invention to be produced with a minimum of individual parts. Through the configuration of the planet carrier from two rotationally symmetric or partially rotationally symmetric components, which are inserted one in the other, wherein the outer diameter of the first sleeve section is adapted to the diameter of the receptacle of the flange part, the axial positioning and the coincidence of the center axes of the two components is guaranteed through simple means and methods. The first ring-shaped disk of the flange part and the second ring-shaped disk of the step-like cup body define a ring-shaped receptacle space surrounding the planet carrier for planet gears. This space is defined inwards in the radial direction by the first sleeve section and is open outwards. The planet gears are held through recesses in the first sleeve section and thus are engaged with the sun gear or a not shown inner geared wheel coaxial to the sun gear. For holding a driveshaft or driven shaft, the flange part is provided with a cup-shaped projection. Through the configuration of the individual components as rotationally symmetric parts, the necessity of positioning the parts relative to each other in the peripheral direction is eliminated, because there is no distinguishing orientation. Furthermore, through the exact fit of the two rotationally symmetric parts, when the planet carrier is assembled, the radial positioning is achieved automatically. At the same time, the receptacle of the first ring-shaped disk of the flange part forms a stop for the step-like cup body in the axial direction, whereby the axial positioning is achieved. Thus, when the planet carrier is assembled, absolutely no orientation or positioning measures have to be taken.

Furthermore, it is proposed to configure the inner diameter of the ring-shaped projection of the cup body larger than the inner diameter of the receptacle of the flange part, whereby a thrust bearing receptacle is created, in which a thrust bearing is arranged.

Advantageously, the second sleeve section is provided with teeth for brake or clutch plates.

In other embodiments of the invention, the flange part and/or the step-like cup body is produced through non-cutting shaping of a sheet metal part. Advantages of these embodiments are the high strength and the low weight, the simple production, and the high dimensional accuracy and quality of the components, whereby expensive finishing work, especially in the area of the weld connection, is eliminated.

Furthermore, aligned bore holes are arranged in the first ring-shaped disk of the flange part and in the second ring-shaped disk of the cup body for holding pins, on which the planet gears are mounted.

It is also provided that the weld connection between the ring-shaped projection of the step-like cup body and the ring-shaped receptacle of the flange part is produced by a resistance welding method.

It is likewise conceivable that the inner surface of the tubular projection is provided with inner serrated teeth. This enables a positive fit connection of the planet carrier to a shaft.

In another configuration of the invention, an inner ring of a free-wheel or a rolling bearing is installed on the cup-shaped projection.

The connection between the cup-shaped projection and the inner ring is preferably produced by a non-positive fit. However, a positive-fit connection or supporting external serrated teeth on the cup-shaped projection is also conceivable.

The inner ring can be configured both as a solid and also in the shape of a cup body with two rims produced through non-cutting shaping of a sheet metal part.

In another advantageous configuration of the invention, the inner ring of the free-wheel comprises a cup body with two rims produced with a non-cutting method. This leads to significant weight savings.

BRIEF DESCRIPTION OF THE DRAWINGS

Additional features of the invention follow from the description below and from the drawings, in which embodiments of the invention are shown in a simplified form. Shown are.

DETAILED DESCRIPTION OF THE PREFERRED EMBODIMENTS

Figure 1:
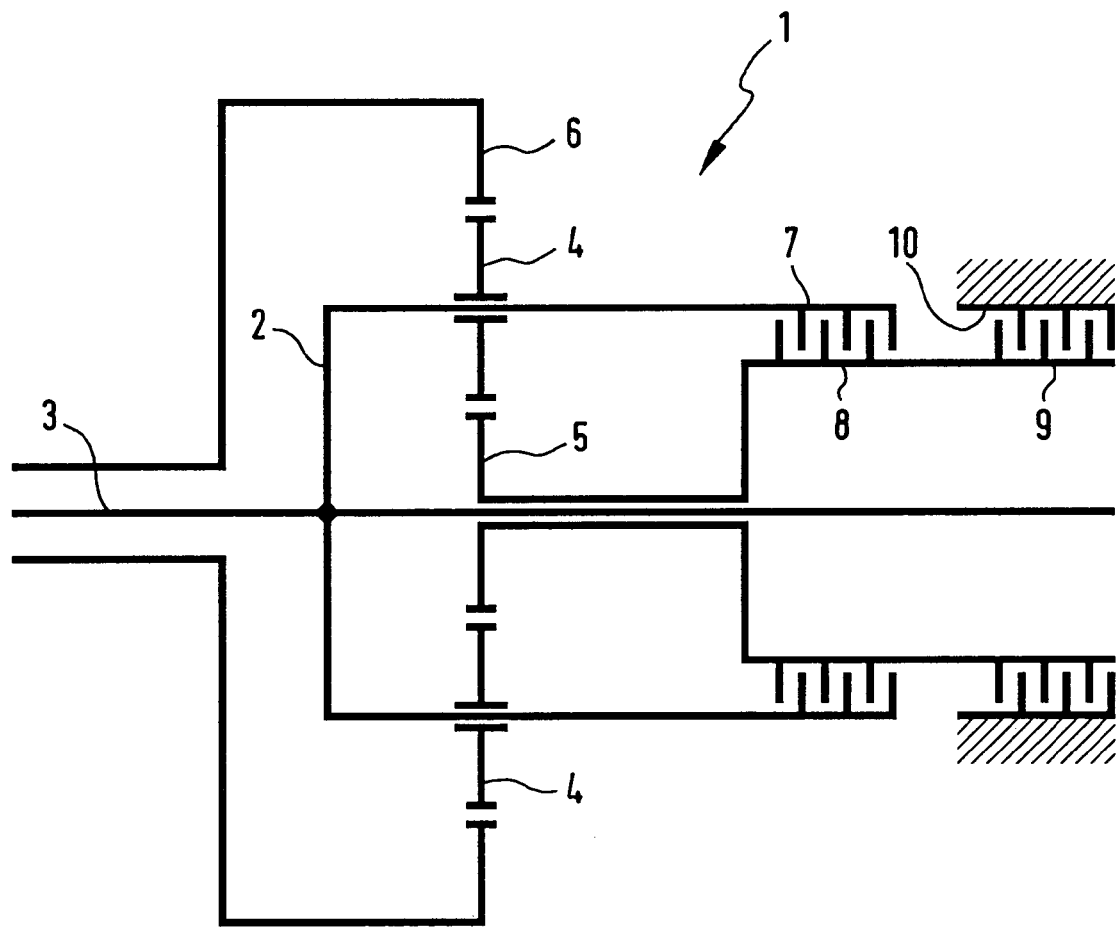
FIG. 1 a schematic representation of a planet gearbox.

As an example for the use of the teaching according to the invention, FIG. 1 shows a schematic illustration of a planet gearbox 1, wherein a planet carrier is designated with 2. The planet carrier 2 is rotationally locked with a shaft 3 and is provided with planet gears 4 offset from its longitudinal axis. The rotational axes of the planet gears 4 lie parallel to the longitudinal axis of the planet carrier 2. A sun gear 5 and an inner gear wheel 6, which are in constant engagement with the planet gears 4, are arranged concentrically and rotatably on the planet carrier 2 or the shaft 3. The planet carrier 2 is provided with a first plate body 7. By means of a second plate body 8, which is connected to the sun gear 5, these components can be coupled to each other. With the help of a third plate body 9, which is connected to the sun gear 5, the sun gear can be braked by a housing-fixed fourth plate body 10.

Figure 2:
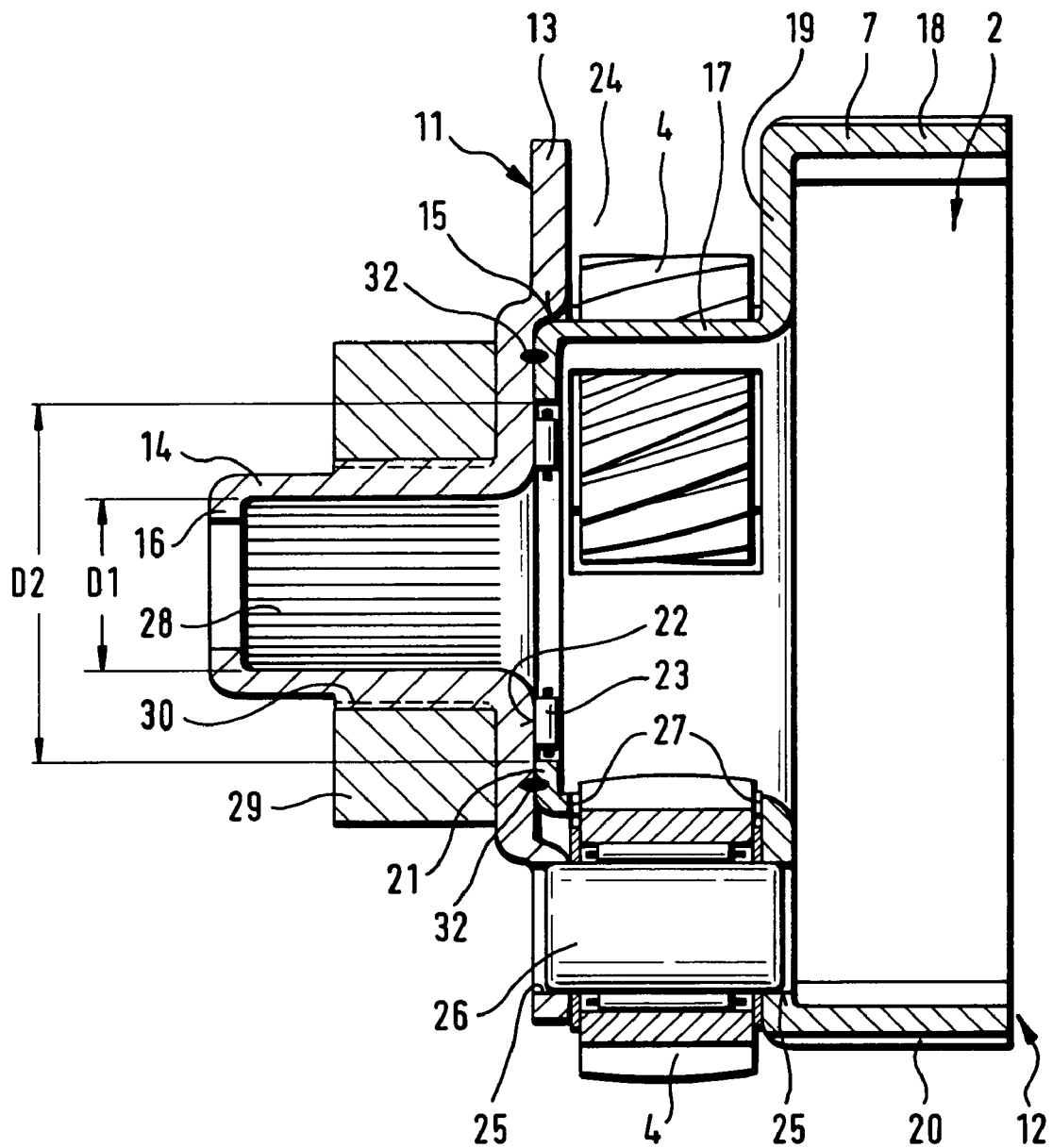
FIG. 2 a longitudinal section through a planet carrier according to the invention, FIG. 3 a longitudinal section through a second embodiment of a planet carrier according to the invention.

The planet carrier 2 according to the invention, which is further shown in FIG. 2, comprises a one-piece flange part 11 and a step-like, similarly one-piece, cup body 12.

The flange part 11 is comprised of a radially extending first ring-shaped disk 13 and an axially extending cup-shaped projection 14, extending from the inner edge of the first ring-shaped disk 13. Furthermore, the first ring-shaped disk 13 is provided with a cylindrical receptacle 15, which is formed by an axial offset and which extends outwards from the inner edge of the first ring-shaped disk 13 in the radial direction. A ring-shaped base 16 is formed on the end of the cup-shaped projection 14 that faces away from the receptacle 15.

The step-like cup body 12 comprises a first sleeve section 17 and a second sleeve section 18, wherein the diameter of the first sleeve section 17 is smaller than that of the second sleeve section 18. The sleeve sections 17 and 18 are connected at one end by a second ring-shaped disk 19, so that they are axially offset relative to each other. The second sleeve section 18 is provided on its outer periphery with teeth 20 for engaging clutch or brake plates (not shown). On the end of the first sleeve section 17 facing away from the second ring-shaped disk 19, there is a ring-shaped projection 21 that extends radially inwardly, whereby the stability of the first sleeve section 17 is increased.

The diameter of the receptacle 15 is adapted to the outer diameter of the first sleeve section 17. The first sleeve section 17 of the cup body engages flush in the radial direction with its projection-side end in the receptacle 15 of the flange part 11 and is partially overlapped by the receptacle in the axial direction. At the same time, the receptacle 15 is used as a stop for the ring-shaped projection 21. Through the configuration according to the invention of the two components of the planet carrier, both the radial and also the axial positioning of the two components relative to each other is reached without complicated positioning measurements. Positioning in the peripheral direction is not necessary due to the rotational symmetry of the individual components.

Between the first sleeve section 17 and the receptacle 15 there is a non-positive connection. A ring-shaped weld connection 32 is thereafter provided between the ring-shaped projection 21 and the receptacle 15, whereby high strength is achieved for the connection, and the two components are secured against rotating in the peripheral direction. For producing the material fixed connection, a resistance welding method is proposed, such as, for example, capacitor discharge welding.

The inner diameter D1 of the receptacle 15 is smaller than the inner diameter D2 of the ring-shaped projection 21, whereby a thrust bearing receptacle 22 is formed, in which a thrust bearing 23 is installed. On this thrust bearing, a sun gear (not shown) is mounted rotatable relative to the planet carrier.

The axial extent of the first sleeve section 17 is selected so that a receptacle space 24 is produced, in which planet gears 4 are arranged. The receptacle space 24 is defined in the axial direction by the first 13 and the second ring-shaped disk 19 and inwards in the radial direction by the first sleeve section 17. According to the configuration of the weld connection 32, the ring-shaped disks 13 and 19 are provided with bore holes 25, which are aligned relative to each other and in which pins 26 are fixed. Planet gears 4 are mounted rotatably on the pins. In the region of the planet gears 4, the first sleeve section 17 is provided with flat sections, in which recesses 27 are provided. These extend in the axial direction between the ring-shaped disks 13 and 19. The expansion in the peripheral direction is held so that the planet gears 4 are freely rotatable about the pins 26 and can be held by the recesses 27. Here, the teeth of the planet gears 4 are in constant engagement with the gear of a not shown inner geared wheel and a similarly not shown sun gear.

Both the flange part 11 and also the step-like cup body 12 are produced through non-cutting shaping from a sheet metal part. With the exception of the bore holes 25, the individual components can be produced in one work cycle. Here, the flange part or the step-like cup body is produced in one deep drawing process. Then the weld connection 32 is produced and then the ring-shaped disks 13 and 19 are provided with bore holes at the corresponding points. This permits inexpensive production of the individual parts with simultaneous high dimensional accuracy. Furthermore, finishing steps, especially in the area of the weld connection 32, can be eliminated.

At the inner periphery of the cup-shaped projection 14, inner serrated teeth 28 are formed, whereby a shaft (not shown) can come into effective positive fit connection with the planet carrier. Here, the ring-shaped base 16 is used as a stop for the shaft.

Furthermore, on the inner ring 29 of a free-wheel or rolling bearing for supporting the internal geared wheel is shown, which is installed on the cup-shaped projection 14 via a press fit. In addition, the inner ring can be effectively locked with the cup-shaped projection 14 by external serrated teeth 30 formed on the cup-shaped projection 14. The inner ring is shown with a solid form in the embodiment shown in FIG. 2.

Figure 3:
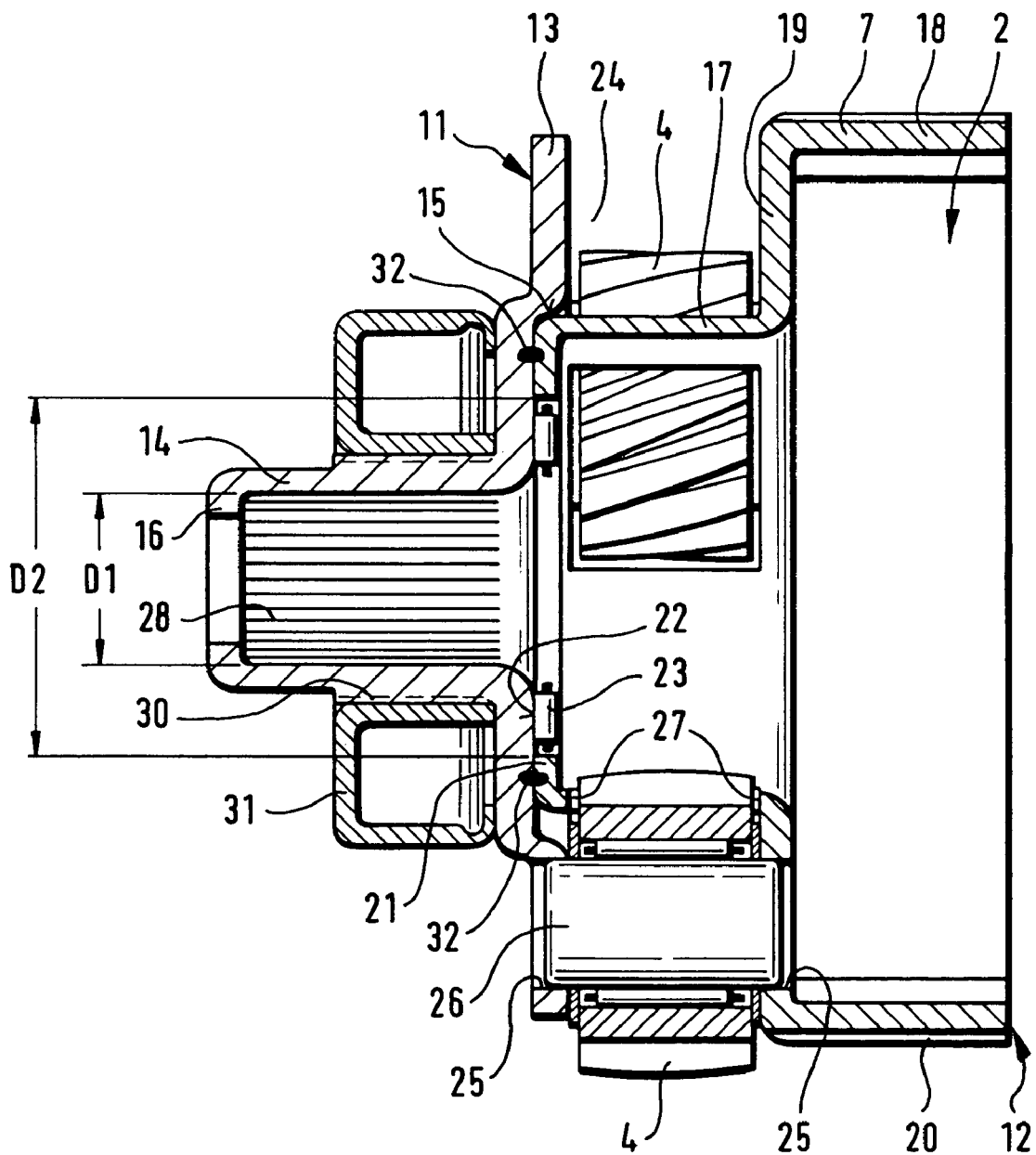

In another embodiment of the invention, which is shown in FIG. 3, the inner ring 31 comprises a cup body with two rims, which is produced with a non-cutting method and which also is effectively locked by a press fit in connection with external serrated teeth 30 formed on the cup-shaped projection 14.

Through the exact fit arrangement of the two nearly rotationally symmetric components in each other, expensive centering measures during assembly can be eliminated. The individual components can be produced lightweight and inexpensively and a lightweight construction is realized through the use of a starting material in the form of sheet metal.

LIST OF REFERENCE SYMBOLS

1 Planet gearbox
2 Planet carrier
3 Shaft
4 Planet gear
5 Sun gear
6 Internal geared wheel
7 First plate body
8 Second plate body
9 Third plate body
10 Fourth plate body
11 Flange part
12 Cup body
13 First ring-shaped disk
14 Cup-shaped projection
15 Receptacle
16 Ring-shaped base
17 First sleeve section
18 Second sleeve section
19 Second ring-shaped disk
20 Teeth
21 Ring-shaped projection
22 Thrust bearing receptacle
23 Thrust bearing
24 Receptacle space
25 Bore hole
26 Pin
27 Recess
28 Inner serrated teeth
29 Inner ring
30 Outer serrated teeth
31 Inner ring
32 Weld connection
D1 Inner diameter
D2 Inner diameter

The invention claimed is:

1. Planet carrier for a gearbox, comprising:
a flange part comprising a radially extending first ring-shaped disk, which is provided with a receptacle formed by an axial offset, and an axially extending cup-shaped projection extending from an inner edge of the receptacle,
a step-like cup body comprising a first sleeve section and a second sleeve section of smaller and larger diameter, respectively, wherein the sleeve sections are connected to each other at one of each of their ends by a radially extending second ring-shaped disk, so that they are offset axially relative to each other, and an angled ring-shaped projection located at an outer end of the first sleeve section,
wherein an outer diameter of the first sleeve section is adapted to an inner diameter of the receptacle of the flange part, wherein the cup body engages at a projection-side end in the radial receptacle of the flange part and is partially overlapped by the receptacle in an axial direction, whereby the ring-shaped projection contacts the receptacle of the flange part in the axial direction,
and with a ring-shaped weld connection between the ring-shaped projection and the receptacle, as well as
recesses for planet gears located in the first sleeve section, wherein the planet gears are guided inwards through the recesses in the sleeve section and engage in a sun gear.

2. Planet carrier for a gearbox according to claim 1, wherein an inner diameter of the ring-shaped projection of the cup body is larger than an inner diameter of the receptacle of the flange part, whereby a thrust bearing receptacle is created, in which a thrust bearing is arranged.

3. Planet carrier for a gearbox according to claim 1, wherein the second sleeve section is provided with teeth for brake or clutch plates.

4. Planet carrier for a gearbox according to claim 1, wherein the cup body is produced through non-cutting shaping of a sheet metal part.

5. Planet carrier for a gearbox according to claim 1, wherein the flange part is produced through non-cutting shaping of a sheet metal part.

6. Planet carrier for a gearbox according to claim 1, wherein aligned bore holes are arranged in the first ring-shaped disk of the flange part and in the second ring-shaped disk of the cup body for holding pins, on which the planet gears are mounted.

7. Planet carrier for a gearbox according to claim 1, wherein the weld connection between the ring-shaped projection of the step-like cup body and the ring-shaped receptacle of the flange part is a resistance weld.

8. Planet carrier for a gearbox according to claim 1, wherein an inner surface of the cup-shaped projection is provided with inner serrated teeth.

9. Planet carrier for a gearbox according to claim 1, wherein an inner ring of a free-wheel or a rolling bearing is installed on the cup-shaped projection of the flange part.

10. Planet carrier for a gearbox according to claim 9, wherein the inner ring is attached with a non-positive fit on the cup-shaped projection of the flange part.

11. Planet carrier for a gearbox according to claim 9, wherein the inner ring is attached with a positive fit on the cup-shaped projection of the flange part.

12. Planet carrier for a gearbox according to claim 10, wherein the cup-shaped projection of the flange part is provided with external serrated teeth, on which the inner ring is installed.

13. Planet carrier for a gearbox according to claim 9, wherein the inner ring of the rolling bearing is formed with a solid form.

14. Planet carrier for a gearbox according to claim 9, wherein the inner ring of the rolling bearing comprises a cup body with two rims produced with a non-cutting method.

* * * * *